Aug. 14, 1962   G. B. LONG ET AL   3,049,655
MOTOR CONTROL SYSTEM FOR DOMESTIC APPLIANCE
Filed Jan. 19, 1959   4 Sheets-Sheet 1

INVENTORS
GEORGE B. LONG
NORTON Q SLOAN
BY Edwin S. Dybvig
THEIR ATTORNEY

Aug. 14, 1962 G. B. LONG ET AL 3,049,655
MOTOR CONTROL SYSTEM FOR DOMESTIC APPLIANCE
Filed Jan. 19, 1959 4 Sheets-Sheet 2

INVENTORS
GEORGE B. LONG
NORTON Q. SLOAN
BY Edwin S. Dybvig
THEIR ATTORNEY

Aug. 14, 1962     G. B. LONG ET AL     3,049,655
MOTOR CONTROL SYSTEM FOR DOMESTIC APPLIANCE
Filed Jan. 19, 1959     4 Sheets-Sheet 3

INVENTORS
GEORGE B. LONG
NORTON Q. SLOAN
BY Edwin S. Dybvig
THEIR ATTORNEY

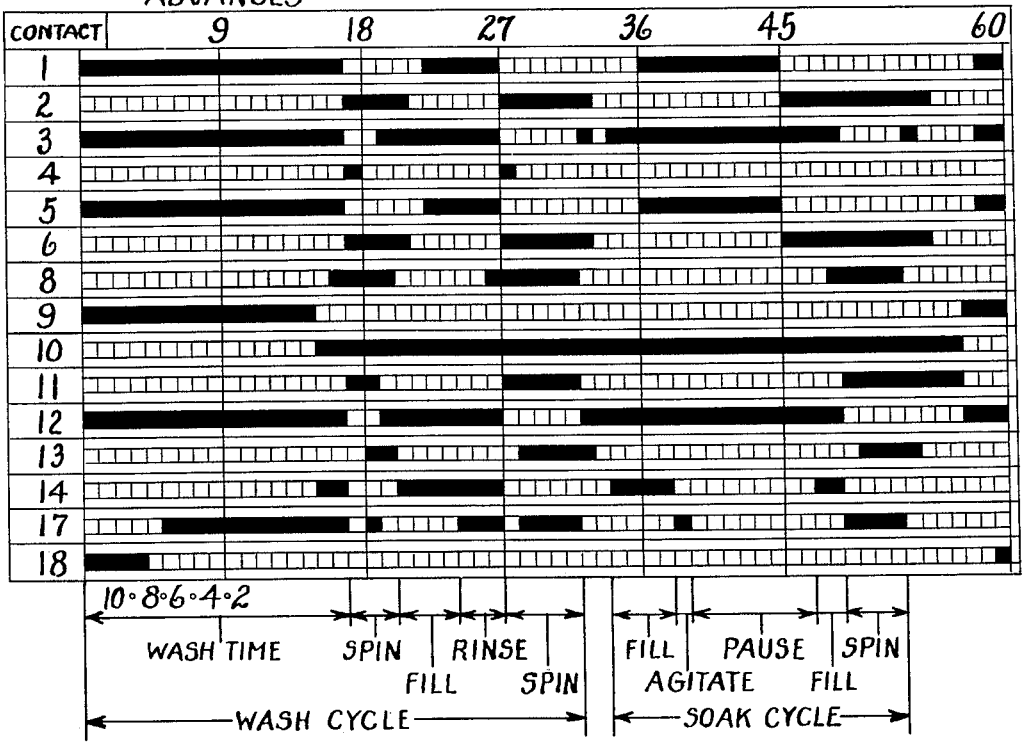
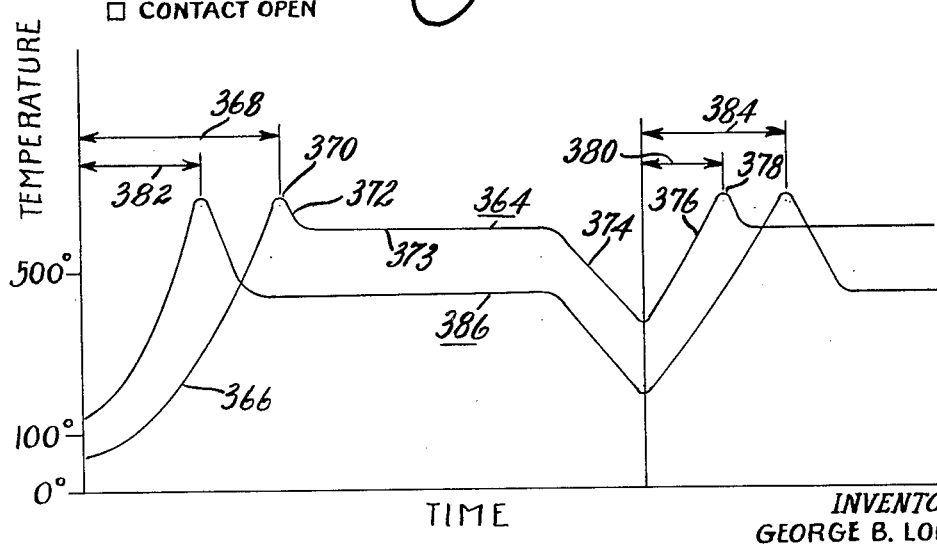

United States Patent Office 3,049,655
Patented Aug. 14, 1962

3,049,655
MOTOR CONTROL SYSTEM FOR DOMESTIC APPLIANCE
George B. Long and Norton Q. Sloan, Dayton, Ohio, assignors to General Motors Corporation, Detroit, Mich., a corporation of Delaware
Filed Jan. 19, 1959, Ser. No. 787,763
10 Claims. (Cl. 318—305)

This invention relates to a domestic appliance and more particularly to an improved operational cycle for a clothes washing machine.

The advancement of the washing machine art has been directed to multi-speed mechanisms wherein the centrifuging or spinning operation is accomplished at more than one speed and wherein different speed changing or gear ratios are provided to effect the different speeds. Since one motor may be utilized to spin the tub selectively at high and low speeds it is desirable to use a circuit design which will permit the use of a motor which is inexpensive and dependable. The most severe task which the motor is called on to perform is in accelerating the washing machine tube from a standing start to high speed spin, the tub being filled with water and clothing. This job requires motors which need heavier windings and more insulation to effectively accommodate the heat produced in such acceleration. It is the purpose of this invention to overcome this difficulty by preventing an acceleration of the tub and motor from zero to high speed in one operation and by taking advantage of a lower gear ratio during such acceleration from a standing start.

Accordingly it is an object of this invention to provide a control cycle for an automatic washing machine which will prevent the initiation of a high speed spin for a delayed period.

It is a more specific object of this invention to include a temperature responsive resistor as a delay device in the high speed spin circuit of a washing machine to insure that a high speed spin will be preceded by a low speed spin.

A further object of this invention is to secure a more stable and consistent time delay by placing the delay device in an air stream.

And still another object of this invention is to cool the delay device by placing the device in the motor cooling air stream.

Further objects and advantages of the present invention will be apparent from the following description, reference being had to the accompanying drawings, wherein a preferred form of the present invention is clearly shown.

In the drawings:

FIGURE 4 is a timer cycle chart showing the open or closed condition of the identically numbered timer contacts in FIGURE 3; and FIGURE 5 is a graph of time versus temperature of the delay device.

Figure 1:
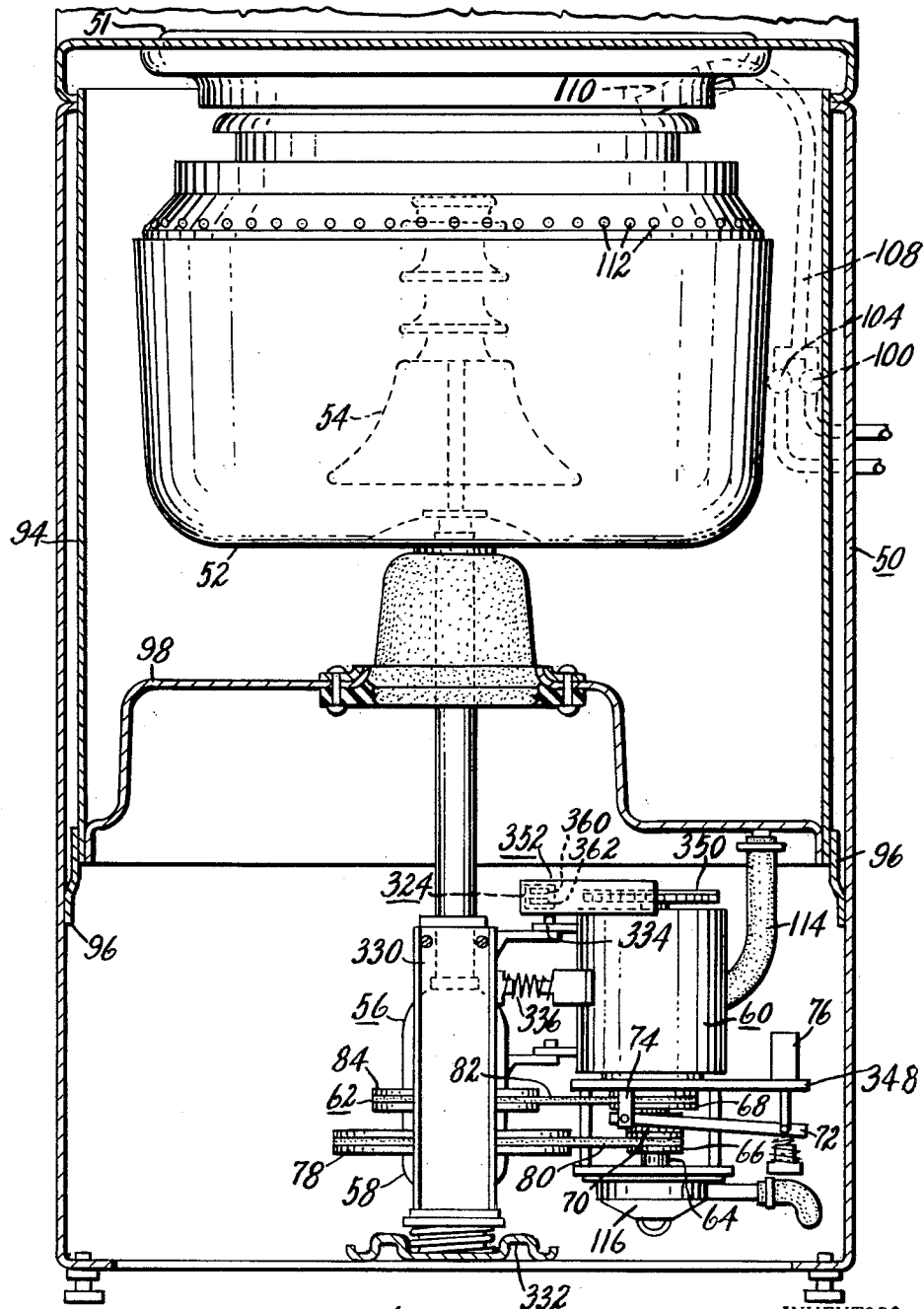
FIGURE 1 is a fragmentary sectional view of a clothes washing machine suitable for use with this invention.

In accordance with this invention and with reference to FIGURE 1, a clothes washer 50 having a clothes loading door or lid 51 is adapted to include a rotatably mounted spin basket 52 and an agitator 54 therein. An agitating and spinning mechanism, shown generally at 56, is utlized to vertically reciprocate the agitator 54 when a rotatable housing portion 58 is rotated in one direction, and to rotate the spin tub 52 in a centrifuging operation when the housing 58 is rotated in a reverse manner. This agitating and spinning mechanism 56 is more fully taught in the patent to Sisson 2,758,685 issued August 14, 1956, and in a copending application to Sisson S.N. 738,362 filed May 28, 1958, for an improvement to the Sisson mechanism. A prime mover or motor 60 may be a 4-pole, 6-pole, 2-speed reversible motor adapted to rotate selectively the mechanism housing portion 58 through a belt-and-pulley arrangement, shown generally at 62. More specifically, the motor 60 is provided with a shaft 64 on which are relatively rotatably mounted a small agitate/spin drive pulley 66 and a larger spin drive pulley 68. A selector clutch 70 is interposed between pulleys 66 and 68 and keyed against relative rotation to the shaft 64, but with relative axial movement permitted. A yoke 72 is pivoted on a bracket 74 by a high speed spin solenoid 76. When the solenoid 76 is deenergized, the selector clutch 70 is biased downwardly and is effective to transmit rotational motion from shaft 64 to the pulley 66 by means of a dogged engagement therewith. The energization of solenoid 76 lifts yoke 72 and causes clutch 70 to frictionally drive pulley 68.

With the motor in a 6-pole arrangement and thus operating in low speed, the pulley 66 will affect a slow speed agitation by rotating housing 58 through a driven pulley 78 affixed thereto and a V-belt 80. With the motor 60 still energized for low speed operation, but in reversed fashion, the pulley 66 will drive pulley 78 to rotate housing 58 in effecting a slow speed spin of tub 52. Fast reciprocation of agitator 54 is accomplished in a 4-pole motor arrangement for operation of motor 60, still driving housing 58 through pulley 66 with solenoid 76 deenergized. Driving pulley 68 is selected by clutch 70 solely for high spin operation when solenoid 76 is energized to lift yoke 72 and engage clutch 70 with driving pulley 68. Thus, a high speed spinning or centrifuging operation is effected by way of motor shaft 64, selector clutch 70, driving pulley 68, V-belt 82 and driven pulley 84. For the purposes of this application, the foregoing description is believed to suffice. However, for a more complete disclosure of the components for this multi-speed driving arrangement, reference may be had to a copending application to Sisson et al. S.N. 738,330 filed May 28, 1958, now Patent No. 2,974,542.

Figure 3:
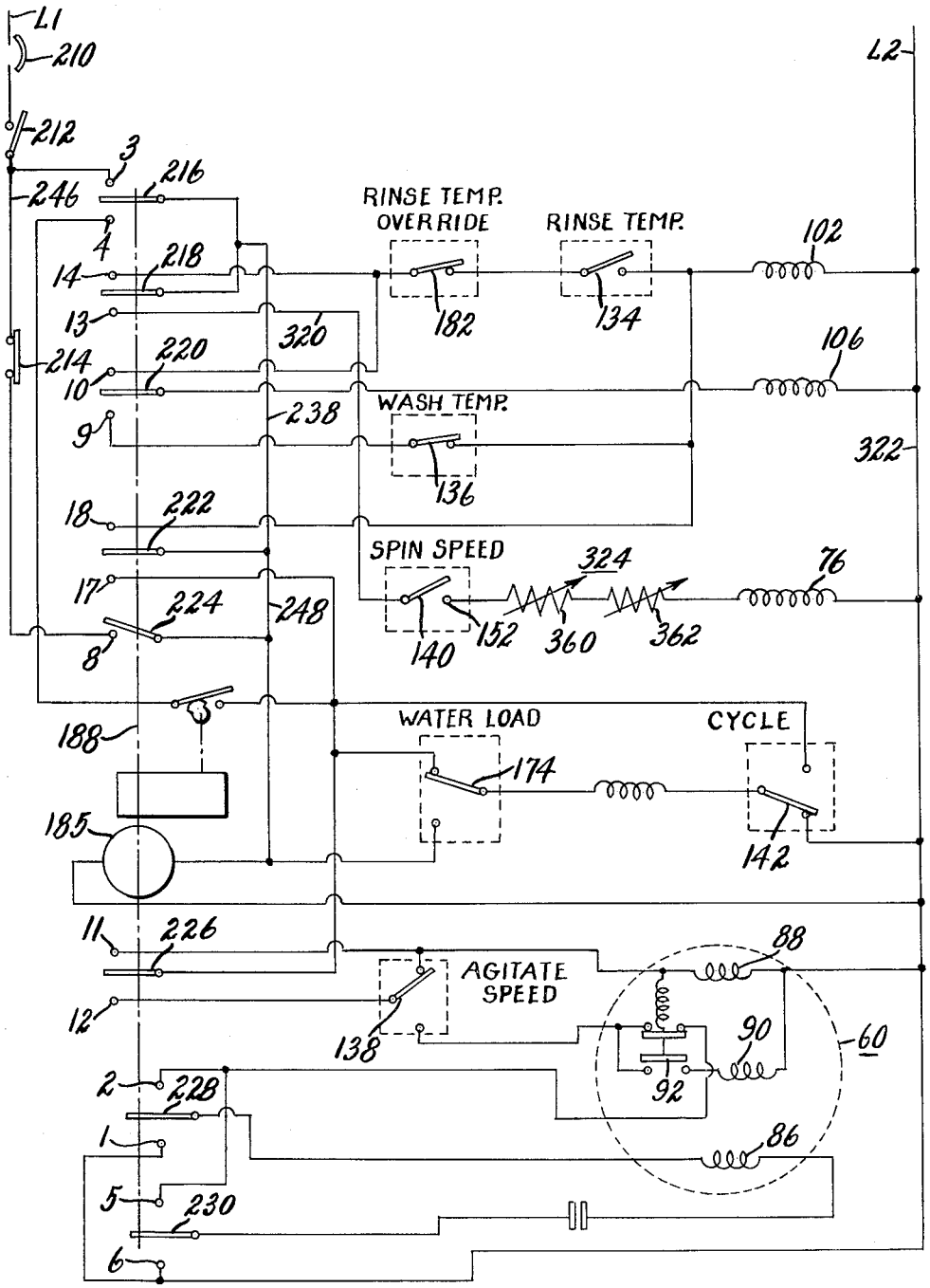
FIGURE 3 is a schematic wiring diagram for controlling an automatic washing machine in accordance with the concepts of this invention.

The motor 60 is provided with a 4-pole start or phase winding 86, a fast speed 4-pole main winding 88 and a slow speed 6-pole main winding 90 (FIGURE 3). The motor 60 includes also a centrifugal switch 92 operable in conventional manner to drop out the phase winding 86 after the motor 60 has accelerated to a predetermined percentage of the selected running speed.

Surrounding the spin tub 52 and spaced therefrom is a water container 94 mounted to the outer casing of the washing machine 50 by brackets 96. A partition or bulkhead 98 closes the lower open end of the water container 94, thereby to separate in water-tight fashion the water-containing area above partition 98 from the driving mechanism disposed therebelow. Water is supplied to the interior of tub 52 through a hot water valve 100 actuated by a hot water solenoid 102 and a cold water valve 104 actuated by a cold water solenoid 106 (FIGURES 1 and 3). A mixing conduit 108 carries the tub water fill at a temperature determined by the positioning of water valves 100 and 104 to a water chute 110 overlying the top opening of spin tub 52. The spin tub, in conventional fashion, is provided with a plurality of outlets 112 for exhausting water therefrom during each spinning operation of the tub. A drain conduit 114 selectively removes the water collecting above the partition 98 in accordance with the operation of a pump 116 disposed at the end of and operated by motor shaft 64.

Figure 2:
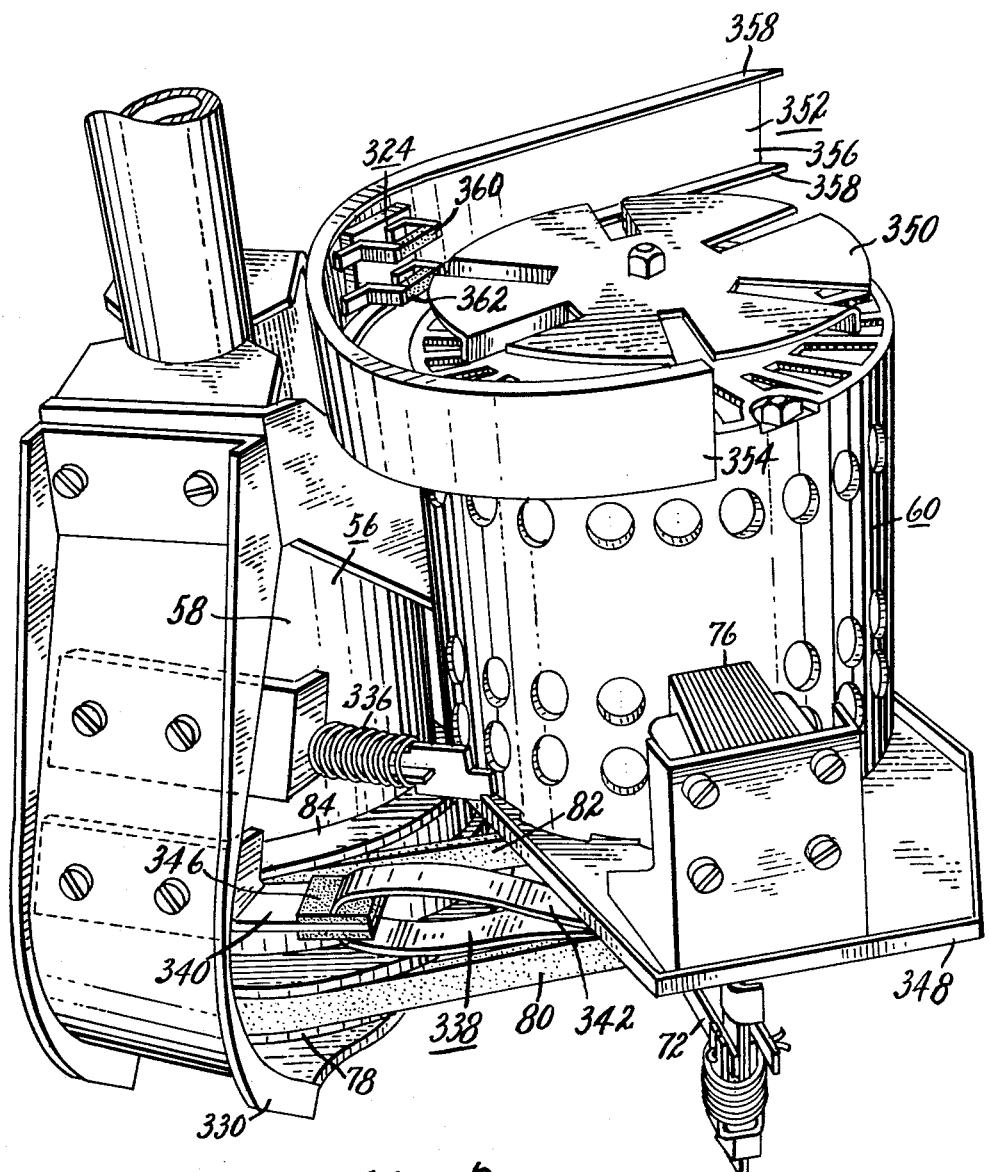
FIGURE 2 is a perspective view of a washing machine prime moving arrangement provided with the teachings of this invention.

For additional detail relating to the prime moving means, reference may now be had to FIGURE 2 for a perspective view of the mechanism. The agitate and spinning mechanism 56 is supported at its lower end by a bracket 330 resiliently snubbed at 332 to the base of the washer 50. The motor 60 is pivoted at one side of the bracket 330 as shown schematically at 334 in FIGURE 1. In order to maintain the tension on belts 80, 82 a compression spring 336 is interposed between the bracket 330 and the motor 60. The pivotal mounting of the motor 60 in conjunction with the spring 336 serves to pivot the motor outwardly. During acceleration and during certain unbalanced conditions within the spin tub 52 the motor 60 is caused to move relatively to the agitate and spin mechanism 56. To minimize such relative motion a snubbing device 338 is utilized. The snubbing device 338 is comprised of a braking bracket 340 affixed to the mechanism bracket 330 and a gripper or snubber 342 of spring material for supporting any suitable frictional material 346 on opposite sides of the braking bracket 340. Thus as the motor 60 tends to pivot or move relatively to the mechanism 56 the snubber 338 will dampen this movement to maintain the prime moving means in a relatively stable condition. One end of the snubber 338 is affixed to a motor support bracket 348. The high speed spin solenoid 76 shown schematically in FIGURE 1 is carried also on the motor support bracket 348, its armature extending through the bracket to actuate the yoke 72 and thus the shifter clutch 70 connected thereto.

In accordance with one aspect of this invention as will be explained more fully hereinafter, the motor 60 is provided with an impeller 350 attached at one end of the motor shaft 64 and adapted to rotate therewith. In juxtaposition to the impeller 350 a sheet metal volute or blower housing 352 is mounted in fixed relationship to the agitate and spinning mechanism support bracket 330. The volute or blower housing 352 is arranged with its one end 354 in closely adjacent relationship to the impeller 350 while the opposite end 356 thereof is more remotely located from the impeller thus forming an efficient but simple blower. The housing 352 is formed also with flanges 358 for channeling the air impelled by the impeller 350. Thus anything installed within the housing 352 such as a thermistor 360 and 362 will be held in an air stream and cooled thereby.

Reference may now be had to FIGURE 3 wherein a general description will be given for the primary components of the washing machine control circuit schematically there shown. The circuit includes a conventional motor overload switch 210 and a master on/off switch 212. For sequentially controlling the washing cycle a timer shaft 188 is arranged to actuate a plurality of timer switches 216, 218, 220, 222, 224, 226 and motor reversing timer switches 228 and 230 for controlling the direction of rotation of motor 60. A timer motor 185 serves to rotate the shaft 188 in sequentially positioning the timer switches. The wash circuit may include a rinse temperature switch 134 and a rinse temperature override switch 182. Water temperatures may be controlled through a wash temperature selector switch 136 and the water load or quantity of fill is manually controllable through a switch 174. A long or short cycle for the washing machine wherein the timer shaft 188 is pulsed or incrementally rotated at either 40-second or 60-second intervals is programmed by the selective positioning of a cycle switch 142. Either fast or slow agitate for agitator 54 is manually programmed with a switch 138 and the high and low speed spin is controlled by the closed or open position of a spin speed selector switch 140 respectively. The timer cycle chart, FIGURE 4, depicts the open or closed position of the various timer contacts in FIGURE 3 and carries identical numbering for ease of reference. This general description is believed sufficient for a complete understanding of the invention here taught. For additional details as to the operation and function of the various components of this washing machine circuit reference may be had to a copending application to Sisson et al. 748,412 filed July 14, 1958, now Patent No. 2,976,710.

The improved circuit of this invention includes a spin operation which always starts in a low 330 r.p.m. tub spin speed until the second timer pulse interval of the spin cycle. Thus, at the beginning of the spin period which is initiated shortly after the start of the 18th and 28th timer advance, the spin cycle will be initiated at a slow speed of 330 r.p.m. for spinning the tub 52 in removing most of the water therefrom. This one timer interval delay permits most of the water to be spun from the tub 52 before initiating high speed spin, thereby minimizing the strain on the motor 60. At the 19th and 29th timer advance the timer contact 13 is closed by timer switch 218 to condition the high speed spin circuit for energization and to place the spin speed selector in the circuit, the spin speed being determined by the positioning of the spin selector switch blade 140. If closed on fast or high speed spin contact 152, the spin solenoid 76 will be energized to lift the shifter fork 72 and thus the selector clutch 70 into engagement with drive pulley 68, thereby accelerating tub 52 to a fast or 850 r.p.m. spin. Without the energization of solenoid 76, the spin will remain 330 r.p.m., the motor shaft 64 driving pulley 66 through the selector clutch 70 and thus rotating the mechanism housing 58 by way of driven pulley 78. Since the speed change ratio is greater in transmitting power from motor 60 through large pulley 68 to the rotatable housing 58 than through the smaller pulley 66, it would appear desirable to accelerate the tub 52 through the most advantageous ratio, i.e. through pulley 66. This too is accomplished by preceding high speed spin with low speed spin. As aforesaid a more particular description of the prime moving arrangement for rotating the mechanism 56 in either a spin direction or an agitate direction is more fully taught in the copending application S.N. 738,330 cited hereinbefore.

One aspect of this invention is directed to providing an operational cycle which will insure that a high speed spinning operation will be started in or preceded by low speed spin. As seen in the timer cycle chart of FIGURE 4 the timer contact 11 is closed at the beginning of the 18th and 28th timer advance and the motor 60 is energized to effect a low speed spinning operation, the clutch 70 being dogged to pulley 66 and the motor 60 energized for 4-pole operation. One timer advance later or at the beginning of the 19th or 29th timer interval respectively, contact 13 will be closed by timer switch 218 to energize the spin circuit. Under normal operation where the washing cycle is permitted to proceed normally from start to finish the delay of one timer advance is always included to permit the tub 52 to spin first in low speed until most of the water is spun from the tub by means of ports 112. Thereafter, when contact 13 is closed, the spin circuit is energized for high speed spin, the solenoid 76 is energized to lift the clutch 70 into driving engagement with high speed spin pulley 68 and the tub 52 and the clothing therein are spun at such speed. However there are certain ways in which the operator may avoid this built-in timer delay and it is to this possibility that one aspect of the present invention relates.

One situation in which the operator can avoid the one timer advance delay of high speed spin is to open the lid 51 during a high speed tub spin, i.e., when the spin speed selector switch blade 140 is closed on contact 152. When the lid 51 is open lid switch 214 is opened as well. This lid opening will deenergize the motor 60 and cause the tub 52 to coast to a stop. Thus the reclosing of the lid 51 and consequently the lid switch 214 will set up an immediate energization of the prime moving means for high speed spin. With reference to FIGURE 1 high speed spin is accomplished by the energization of solenoid 76 which lifts the clutch 70 by means of yoke 72 into frictional driving engagement with the drive pulley 68. In this fashion driven pulley 84 affixed to the mechanism housing 58 is rotated at high speed thereby imparting a high speed spin to the tub 52. Accelerating tub 52 from zero r.p.m. to 850 r.p.m. imparts severe strain to the motor 60 and requires additional insulation on the windings thereof to offset the added heat loss from such rapid acceleration. This possibility is overcome by the teachings of this invention.

Another way in which the user may avoid the high speed spin delay built into the timer cycle is to manually advance the timer by rotating the timer shaft 188 through the 18th or 28th timer advance which is designed into the timer cycle as a high speed spin delay. This shaft rotation repositions the cam actuated switches 218, 222 and 226 to cause the prime moving means to be energized immediately for high speed spin. The addition of a delay means to the high speed spin circuit in accordance with the teachings of this invention overcomes both of the aforementioned operational possibilities and insures that a low speed spin will always precede a spin of high speed.

With reference to FIGURE 3 the high speed spin circuit may be described as from $L_1$, a motor overload switch 210, on/off switch 212, line 246, lid switch 214, timer switch 224, line 248, line 238, timer switch 218, timer contact 13, line 320, spin speed selector switch blade 140, high speed spin solenoid 76 and line 322 to $L_2$. To insure that solenoid 76 will not be energized until the motor 60 is energized first for low speed spin drive through pulley 66, a timed delay device 324 is added to the circuit. This delay provides time for the driving mechanism to rotate the tub 52 in low speed spin before the solenoid 76 is energized. For purposes of clarity low speed spin may be described with reference to FIGURE 1 wherein the deenergization of high speed solenoid 76 permits the dogged engagement of clutch 70 with drive pulley 66, thereby driving the rotatable housing 58 of the agitate and spinning mechanism 56 to effect a low speed spin of the tub 52.

The time delay device 324 is included in the spin speed circuit for eliminating any possibility of initiating the prime moving means for high speed spin without having first preceded high speed spin with low speed. The delay device 324 is shown comprised of thermistors 360 and 362 connected in series with the spin speed control switch 140 and the high speed spin solenoid 76. The thermistors 360, 362 are generally of a semi-conducting metal oxide with a suitable binder and as such become a temperature responsive resistor or in the broadest sense a negative temperature coefficient resistance. Found satisfactory for use in this invention but in no way by means of limitation the thermistors 360, 362 may each be approximately one inch in length and have a cross sectional area equivalent to a ¼ inch diameter. Thus whenever the high speed spin circuit is energized current is caused to pass through the thermistors 360, 362 which at first pass a limited amount of current to the solenoid 76. This current however is insufficient to actuate the solenoid 76 and the high speed spin circuit is effectively prevented from energizing the high speed spinning means of the washing machine. As the temperature of the thermistors increases, additional current is passed to the solenoid 76 until the actuating current required for the solenoid is reached and the solenoid 76 energized. It should be noted that where a normal washing cycle is caused to proceed in accordance with the cycle built into the timer, the high speed spin circuit is delayed the one timer advance programmed into the timer plus the delay of the thermistors delay device 324. This consolidated delay occurs during the time the thermistors are heating up to the point at which time sufficient current is passed to actuate the solenoid 76. Although this delay prevents the initiation of high speed tub spin from a dead start the time delay interval is undesirably long. An improvement in this regard results when the delay device 324 is placed in the motor air stream as will be explained more fully hereinafter.

A better understanding of the operation of the delay device 324 may be gained from a reference to FIGURE 5 wherein a graph of the thermistor operation showing time versus thermistor temperature is set forth. Where the thermistors 360 and 362 are mounted in a dead air space, the room ambient curve 364 represents the operation of the delay device 324. It may be seen that upon initial energization of the high speed spin circuit and thus the thermistors 360 and 362 the temperature of the thermistors will increase along that portion 366 of the curve 364. Considering the resistance of the thermistors at approximately 3,000 ohms at room ambient and at approximately 20 ohms at 700° F. it is apparent that the resistance decreases during the time that the thermistors are energized. In series with the thermistors is the solenoid 76 which has an impedance of approximately 10 ohms when in an open condition and approximately 120 ohms when closed. Thus during the period that the thermistors are heated (curve portion 366) the resistance of the thermistors is steadily decreased until the point 370 on curve 364 is reached at which point the solenoid 76 is actuated. At the instant that the thermistors 360 and 362 start to pass sufficient current to actuate the solenoid 76 approximately four amperes are flowing through the solenoid field and the temperature of the thermistors is in the area of approximately 700°. Immediately upon actuation of the solenoid 76 the impedance thereof increases to 120 ohms and the current flowing therethrough drops to approximately .75 ampere thus causing the temperature of the thermistors to drop off quickly along that portion of the curve 372. Where the washing machine cycle is permitted to proceed normally in accordance with the programming of the timer, the curve portion 373 represents the temperature of the delay thermistor device 324 during high speed spin. However, if the operator chooses to open the lid 51 during the high speed spin cycle, current through the high speed spin circuit will immediately be interrupted and the temperature of the thermistors 360, 362 will start to decrease as along curve portion 374. When the lid 51 is again closed thereby closing the lid switch 214 and energizing the high speed spin circuit, the temperature of the thermistor will again increase along curve portion 376 to the point 378 where the thermistors are passing sufficient current to actuate the solenoid 76 as explained in conjunction with the initial actuation immediately hereinabove. The objection to the delay device 324 when operated at room ambient is that the initial delay 368 (approximately 40 seconds) is too long when added to the one timer advance built into the wash cycle, and the subsequent delay 380 on repeat lid openings (approximately 3 seconds) is too short. The reason for these undesirable delay intervals is the slow reaction time of the thermistors—they heat up and cool off relatively slowly. Therefore it is the purpose of this invention to provide a scheme whereby the operation of the delay device 324 is stabilized by blowing air over the thermistors 360, 362. Thus the initial delay 368 will be decreased while the repeat delays 380 will be increased.

One method whereby the operation of the thermistors 360, 362 may be made more favorable is by installing them in the air stream generated by the blower system of motor 60. This then maintains the thermistors above room ambient at about 110° F. to reduce the initial delay 368 and cools the thermistors on repeat operations to decrease the delay 384. For purposes of clarity an impeller 350 has been added to the shaft 64 of motor 60 and arranged to be rotated thereby. In this arrangement the thermistors 360, 362 may be placed adjacent the impeller 350 and are sufficiently cooled in this regard without the addition of a volute blower housing 352. However the optimum cooling is effected by forming a sheet metal blower housing 352 which partially circumscribes the impeller 350 and thereby places the thermistors 360, 362 in the maximum air flow stream. Where an additional impeller 350 is not desired to be installed, the thermistors 360, 362 may be placed in the air stream issuing from any conventional motor. In any event, the operation of the thermistors is stabilized by the air flow thereover.

The operation of the high speed spin circuit delay will now be more fully understood in connection with FIGURE 5 wherein the curve 386 representing motor air cooling is shown to solve both problems found in connection with the room ambient installed thermistors. The initial time delay 368 imposed upon the high speed spin circuit is shortened to a delay 382 since the thermistors are above room ambient at high speed spin initiation; and the subsequent repeat delays (resulting from opening lid 51) are lengthened as at 384, thereby solving both problems by the addition of a motor air cooling application to the thermistor delay device 324. The operational curve 386 for the air cooled thermistor may be explained in substantially the same fashion as was the operation of the thermistors in connection with room ambient curve 364 and need not be repeated.

In operation the air cooled thermistor device 324 is now effective to preclude any possibility of starting the motor 60 and the related prime moving means for a high speed spin without first preceding such spin with low speed. Assume that the operator has selected a high speed spin with switch 140 in a closed position on contact 152 the washing cycle will proceed in accordance with the timer programming as evidence in FIGURE 4. During the 18th or 28th timer advance the prime moving means will be energized for low speed spin, i.e. the solenoid 76 will be deenergized thus causing clutch 70 to be dogged to pulley 66 in rotating the mechanism housing 58 for low speed tub spin. At the conclusion of the 18th and 28th timer advance timer switch 213 will be closed on contact 13 to energize the high speed spin circuit. Thus current will flow to the thermistor delay device 324 which will gradually increase the current allowed to flow therethrough until sufficient current is passsed to actuate the high speed solenoid 76. If the washing cycle is not interrupted during spin the cycle will be completed in accordance with the timer programming. However if the operator interrupts the washing cycle by opening the lid 51 and thereby opening the lid switch 214 the thermistor delay device 324 will start cooling. When the user again closes the lid 51 the thermistor will again program a delay of the actuation for solenoid 76. Since low speed spin is effected only when the high speed spin solenoid 76 is deenergized, the tub 52 and the entire prime moving means will again be accelerated at low speed spin, thereby utilizing the favorable gear ratio between drive pulley 66 and driven pulley 78. After the predetermined period the thermistors will pass sufficient current to actuate the solenoid 76 and high speed spin will be effected, the motor 60 rotating tub 52 through pulleys 68 and 84.

Similarly if the operator of the washing machine advances the timer manually by rotating the timer shaft 188 immediately into the spin portion of the cycle, namely timer advances 18, 19 and 20 or timer advances 28, 29, 30, 31 and 32, the high speed spin is again delayed by the same operation of the thermistor device 324. Thus it should be seen that an effective delay has been provided which will insure that a low speed spin will precede high speed thereby taking advantage of the most favorable gear ratio during acceleration of the high inertia components and thus minimizing the strain on the motor 60. Furthermore the cooling of the delay device 324 adds materially to a reduced and a consistent repeat delay operation, while utilizing the air stream of the motor for such cooling effects a shortening of the initial delay in an efficient and economical manner.

While the form of embodiment of the invention as herein disclosed constitutes a preferred form, it is to be understood that other forms might be adopted, as may come within the scope of the claims which follow.

What is claimed is as follows:

1. A control circuit for a centrifuging appliance having a container comprising, prime moving means for rotating said container at high and low speeds including a primary motor, a blower for directing an air stream in heat exchange relationship to said primary motor, a power supply, a timer including a timer motor and a plurality of timer switch means sequentially operated by said timer motor, a speed selector switch connected to the power supply through one of said timer switch means, a temperature responsive resistor time delay device in series with said speed selector switch and said one of said timer switch means and in the path of said air stream, means in said timer including another of said timer switch means for energizing said prime moving means for low speed rotation, and means in said timer including said one of said timer switch means for energizing said device to delay high speed rotation when said speed selector switch is set for high speed.

2. A control circuit for a centrifuging appliance having a container comprising, prime moving means for rotating said container at high and low speeds including a primary motor, a blower for directing an air stream to cool said primary motor, a power supply, a timer including a timer motor and a plurality of timer switch means sequentially operated by said timer motor, a centrifuging speed selector switch connected to the power supply through one of said timer switch means, a thermistor time delay device in series with said speed selector switch and said one of said timer switch means and in said air stream, means in said timer including another of said timer switch means for energizing said prime moving means for low speed rotation, and means in said timer including said one of said timer switch means for energizing said device to delay high speed rotation when said speed selector switch is set for high speed.

3. A control circuit for a centrifuging appliance having a container comprising, prime moving means for spinning said container at high and low speeds including a primary motor, an impeller for directing an air stream to cool said primary motor, a volute housing partially circumscribing said impeller, a power supply, a timer including a timer motor and a plurality of timer switch means sequentially operated by said timer motor, a spin speed selector switch connected to the power supply through one of said timer switch means, a thermistor time delay device in series with said spin speed selector switch and said one of said timer switch means and mounted on said housing, means in said timer including another of said timer switch means for energizing said prime moving means for low speed spin, and means in said timer including said one of said timer switch means for energizing said device to delay high speed spin when said spin speed selector switch is set for high speed.

4. A control circuit for a centrifuging device having a container, prime moving means for rotating said container at high and low speeds comprising, a power supply, a timer including a timer motor and a plurality of timer switch means sequentially operated by said timer motor, a speed selector switch connected to the power supply through one of said timer switch means, a thermistor time delay device connected through said speed selector switch to said one of said timer switch means, first means including another of said timer switch means for energizing said prime moving means for low speed rotation, and second means operative concurrently with said first means and including said one of said timer switch means for energizing said device to delay high speed rotation when said speed selector switch is set for high speed.

5. A control circuit for a washing machine having a tub, means energizable for rotating said tub at low speed, means energizable for conditioning said rotating means for rotating said tub at high speed, and means including an air cooled temperature responsive resistor in series electrical flow relationship with said conditioning means and concurrently energizable with said rotating means for controlling said conditioning means to delay energization thereof so that a high speed rotation of said tub will be preceded always by a low speed rotation.

6. A control circuit for a centrifuging device having a prime moving means for rotating a container at high and low speeds comprising, a power supply, a timer including a timer motor and a plurality of timer switch means sequentially operated by said timer motor, a speed selector switch connected to the power supply through one of said timer switch means, an air cooled thermistor time delay device connected through said speed selector switch to said one of said timer switch means, first means including another of said timer switch means for energizing said prime moving means for low speed rotation, and second means operative concurrently with said first means and including said one of said timer switch means for energizing said device to delay high speed rotation when said speed selector switch is set for high speed.

7. A control system for an appliance having a tub comprising, means energizable for selectively spinning said tub at low speed, means energizable for conditioning said spinning means for spinning said tub at high speed, and control circuit means for said spinning means to initiate said spinning at low speed, said control circuit means including a negative temperature coefficient resistance in series electrical flow relationship with said conditioning means and concurrently energizable with said spinning means for completing a circuit with said conditioning means after a predetermined time interval.

8. A control system for an appliance having a tub comprising, means energizable for spinning said tub at low speed, means energizable for conditioning said spinning means for spinning said tub at high speed, and control circuit means for said spinning means to initiate said spinning at low speed, said control circuit means including a contactless regulator in series electrical flow relationship with said conditioning means and concurrently energizable with said spinning means for completing a circuit with said conditioning means after a predetermined time interval.

9. A control system for a centrifuging device having a tub comprising, means energizable for selectively spinning said tub at low speed, circuit means energizable concurrently with said spinning means for conditioning said spinning means for spinning said tub at high speed, said last named means including a high or low speed control switch means, and means in series electrical flow relationship with said control switch means for preventing energization of said conditioning circuits means until after energization of said spinning means for low speed, said preventing means including an air cooled temperature responsive resistor.

10. A control circuit for a washing machine having a container, a lid for said container and a prime moving means for rotating said container at high and low speeds comprising, a power supply, a timer including a timer motor and a plurality of timer switch means sequentially operated by said motor, a lid switch adapted to energize said timer motor when said lid is closed, a manually actuatable speed selector switch connected to the power supply through one of said timer switch means, a time delay controller in series with said speed selector switch, said one of said timer switch means and said lid switch, said delay controller including a thermistor, an impeller for directing a stream of air in heat exchange relationship with said prime moving means and said thermistor, means in said timer including another of said timer switch means for energizing said prime moving means for low speed rotation, and means in said timer including said one of said timer switch means for energizing said controller to delay high speed rotation when said speed selector switch is set for high speed.

References Cited in the file of this patent
UNITED STATES PATENTS

| | | |
|---|---|---|
| 2,831,078 | Greenwald | Apr. 15, 1958 |
| 2,839,623 | Stolle | June 17, 1958 |